J. B. ADAMS & L. M. MILLER.
COTTON CHOPPER.
APPLICATION FILED APR. 23, 1914.

1,132,543.

Patented Mar. 23, 1915.
2 SHEETS—SHEET 1.

L. M. Miller and
J. B. Adams Inventors by C. A. Snow & Co.
Attorneys

Witnesses

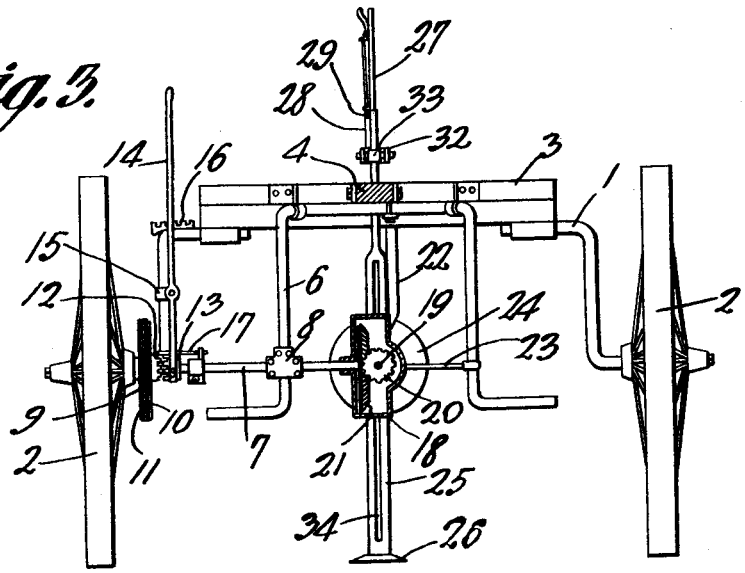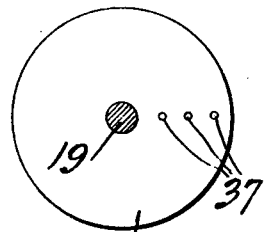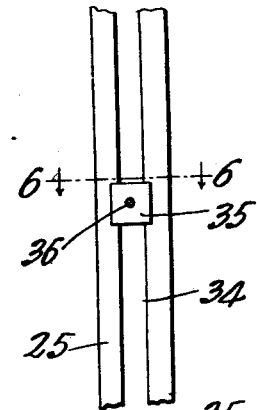

UNITED STATES PATENT OFFICE.

JOE B. ADAMS AND LAWRENCE M. MILLER, OF COOPER, TEXAS.

COTTON-CHOPPER.

1,132,543.

Specification of Letters Patent. Patented Mar. 23, 1915.

Application filed April 23, 1914. Serial No. 834,020.

*To all whom it may concern:*

Be it known that we, JOE B. ADAMS and LAWRENCE M. MILLER, citizens of the United States, residing at Cooper, in the county of Delta and State of Texas, have invented a new and useful Cotton-Chopper, of which the following is a specification.

The present invention appertains to cotton choppers, and aims to provide a novel and improved cotton chopper attachment for riding cultivators.

The present invention also contemplates the provision of a cotton chopping device embodying a unique assemblage of component parts, whereby the device will operate in a novel and efficacious manner for chopping or thinning out of rows of cotton stalks, or other plants.

It is also within the scope of the present invention, to provide a cotton chopper which shall be improved generally in its construction, to thereby enhance the utility of the device, and to render the device readily attachable to cultivator frames, as well as providing a device which will be comparatively simple and inexpensive in construction, as well as being practical, serviceable and efficient in its use.

With the foregoing and other objects in view which will appear as the description proceeds, the invention resides in the combination of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein—

Figure 1:
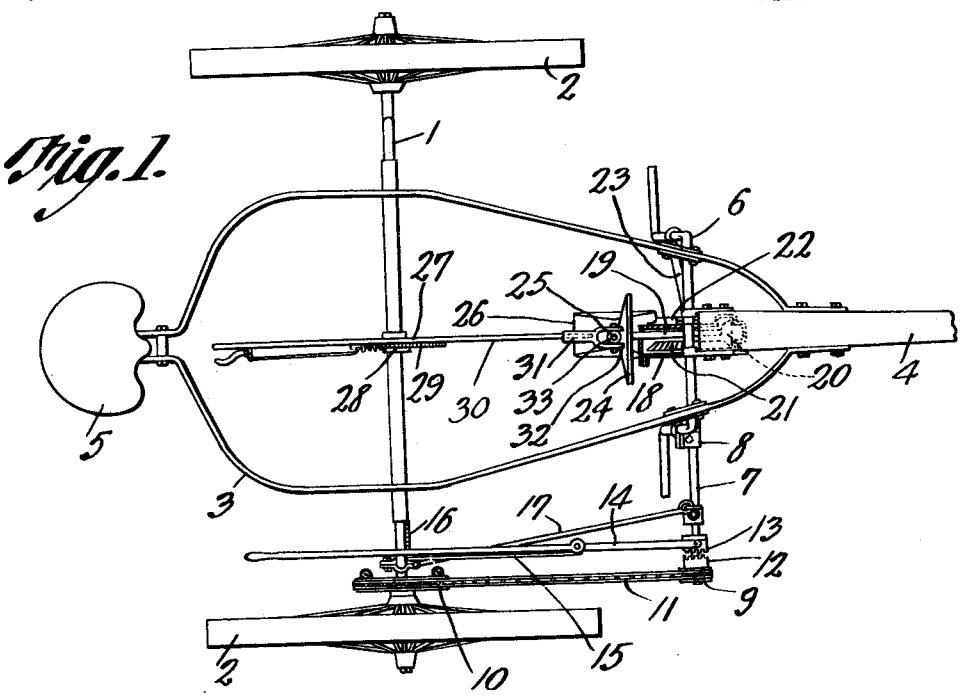
Figure 2:
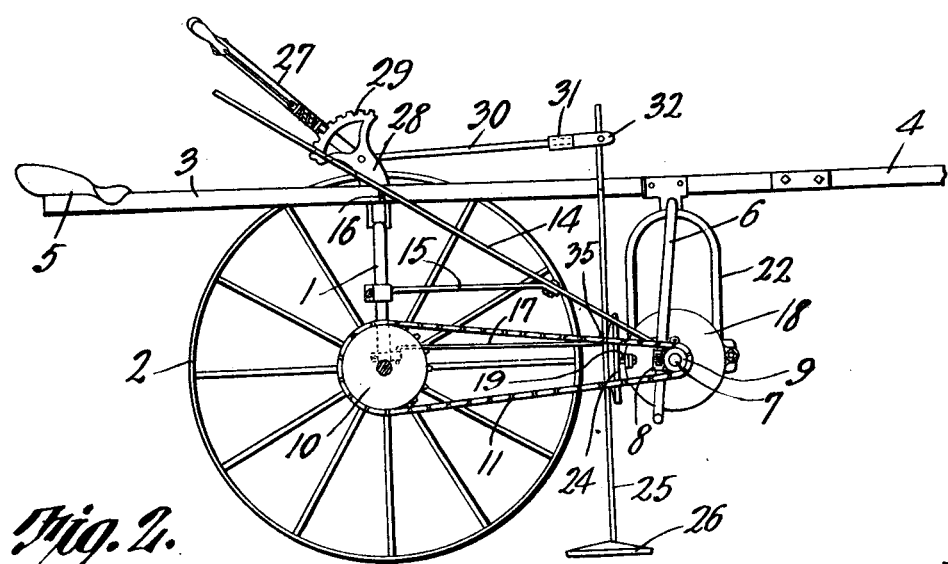

Figure 1 is a plan view of the attachment as applied to a cultivator. Fig. 2 is a side elevation thereof, the wheel at the near side being removed. Fig. 3 is a front view of the device as applied. Fig. 4 is an elevation of the actuating disk for the hoe lever or handle. Fig. 5 is a fragmental elevation of the hoe lever or handle, as illustrating the slide or cross head carried thereby. Fig. 6 is a cross sectional detail taken on the line 6—6 of Fig. 5.

In the drawings, the cultivator illustrated, which is of the usual and conventional type, embodies an arched axle 1 having the ground wheels 2 journaled to its ends, and a frame 3 secured upon the axle 1 and having the tongue 4 attached to its forward end, and the seat 5 carried by its rear end. An arched hanger 6 is secured to the forward portion of the frame 3, as usual, for the connection of the cultivator beams (not shown), the beams being preferably left on when the cotton chopping attachment is applied to the cultivator.

The present attachment includes a transverse shaft 7 journaled through a bearing 8 which is clamped or attached to one limb of the hanger 6, and which has a pinion 9 journaled loosely upon its outer extremity. The pinion 9 is connected to a driving sprocket wheel 10 by means of a sprocket chain 11, the sprocket wheel 10 being clamped or otherwise engaged to the inner side of one ground wheel 2 to rotate therewith.

In order to operatively connect the sprocket or pinion 9 to the driving shaft 7, the inner side of the sprocket 9 is provided with a clutch hub 12, and a clutch member 13 is feathered or slidable upon the shaft 7 so as to engage and disengage the clutch hub 12. The clutch member 13 is actuated through the medium of a hand lever 14 fulcrumed upon a bracket 15 carried by the arched axle 1, the upper arm or handle of the lever 14 preferably projecting above one end portion of the axle 1 to be readily manipulated by the operator seated upon the seat 5. A segment or rack 16 is secured upon the axle 1 for the engagement of the upper arm or handle of the lever 14 for holding the lever in any position to which it is swung, and to either hold the clutch member 13 in or out of engagement relative to the pinion 9.

That portion of the shaft 7 intermediate the pinion or sprocket 9 and the bearing 8 is steadied by means of a brace 17 connecting the said portion of the shaft and corresponding upright portion of the axle 1. The other or inner end of the shaft 7 is journaled through one side of a gear casing or boxing 18, and a short longitudinal shaft 19 is journaled through the rear portion of the casing or housing 18, and has a bevel gear or pinion 20 keyed to its forward end within the casing 18 and intermeshing with a relatively large bevel gear 21 keyed or secured to the inner end of the shaft 7 within the casing 18. The casing 18 thus houses the gears 20 and 21, and is preferably supported by means of a hanger 22 having its upper end clamped and attached to the upper portion of the hanger 6, to not only support the casing 18, but to support the inner end of the shaft 7 as well. The brace 23 connects the casing 18 and that limb of the hanger 6 opposite the limb having the bearing 8 clamped thereto, to assist in steadying the casing or housing 18. The rear end of the shaft 19, protrudes from the casing 18, and has attached thereto, an actuating disk 24, the rear face of which is convexed.

The disk 24 serves to actuate the oscillatory lever or handle 25 which carries the hoe or cutting blade 26 at its lower end, as will hereinafter more fully appear. The means for supporting and adjusting the lever or handle 25, embodies a hand lever 27 fulcrumed to the casting member 28 attached upon the crest portion of the axle, and having controllable means for engaging the segment 29 of the casting 28 to hold the lever 27 at any adjusted position. The lever 27 is readily manipulated from the seat 5, and embodies a forwardly projecting arm 30 overhanging the disk 24. A sleeve or tubular member 31 is journaled upon forward or free end portion of the arm 30 and is provided with a fork 32 between the arms of which is trunnioned or pivoted a collar 33 embracing the upper end portion of the lever 25. Thus, the forked sleeve 31 in being journaled upon the free portion of the arm 30 may oscillate to permit of the oscillation of the lever 25, and the collar 33 being trunnioned within the fork of the sleeve 31 enables the lever 25 to oscillate longitudinally, or forwardly and rearwardly of the machine.

In order to operatively connect the lever 25 to the actuating disk 24, the lever 25 is provided with an elongated longitudinal slot 34 in which is slidably mounted a slide or cross head 35 having a wrist pin 36 engaged therethrough. The wrist pin 36 is engaged through one of a radial series of apertures 37 provided in the disk 24, so that when the disk 24 is rotated, an oscillatory movement will be imparted to the lever 25, the slide 35 reciprocating within the slot 34 of the lever 25 during the rotation of the disk 24. It is evident that by adjusting the wrist pin 36 radially of the disk 24, the amount or degree of oscillation of the lever 25 may be regulated as desired.

In operation, as the cultivator is drawn forwardly, the sprocket wheel 10 will be rotated with the corresponding ground wheel 2, so as to rotate the sprocket wheel 9 at a relatively high velocity. Ordinarily, when the clutch member 13 is disengaged from the sprocket 9, the shaft 7 will remain in idle condition, but may be brought to operation by throwing the clutch member 13 into engagement with the clutch hub 12 of the sprocket 9, through the medium of the lever 14, whereby rotary motion of the shaft 7 will be imparted to the shaft 19 for rotating the disk 24. The disk 24 being rotated, will oscillate the lever 25, to correspondingly actuate the hoe or cutter 26 laterally. Thus, when the machine is drawn astride of a row of cotton stalks or plants, the hoe 26 being reciprocated transversely through the row of stalks or plants, will thin the row out, as will be obvious without further discussion, and is familiar in the art.

The vertical position of the hoe or cutter 26 is governed through the medium of the lever 27, it being noted that by swinging the lever 27 to raise and lower the arm 30 thereof, the hoe lever 25 may be correspondingly raised or lowered. It is evident that the oscillatory sleeve 31 mounted upon the arm 30 of the lever 27, permits the hoe lever 25 to oscillate laterally, while the collar 33 being trunnioned within the fork of the sleeve 31, will enable the lever 25 to oscillate longitudinally of the machine, as when the lever 27 is swung. Thus, by controlling the position of the lever 27, the hoe or cutter 26 may be adjusted according to the varying conditions, and to properly sever or cut the stalks or plants.

The lateral throw of the hoe or cutter 26 may be regulated, by adjusting the wrist pin 36 of the disk 24, as above intimated.

The other advantages of the present device will be obvious from the foregoing, taken in connection with the drawing, and without further comment being necessary.

Having thus described the invention, what is claimed as new is:

1. In a cotton chopper, a rotary driving member having a wrist pin, a slotted lever engaged by the wrist pin and having a lower blade, an adjusting lever, and a member pivoted to the adjusting lever and pivotally connected to the upper end portion of the slotted lever.

2. In a cotton chopper, a rotary driving member having a wrist pin, a slotted lever engaged by the wrist pin and having a lower blade, an adjusting lever, a sleeve journaled upon the end of one arm of the adjusting lever and having a fork, and a member attached to the upper end portion of the first mentioned lever and trunnioned within the said fork.

3. In a cotton chopper, a wheel mounted frame, an arched hanger carried thereby, a bearing attached to one limb of the said hanger, a shaft journaled through the said bearing, means for connecting and disconnecting the said shaft and one of the wheels of the frame, a casing disposed within the said hanger, a hanger connecting the said casing with the upper portion of the said arched hanger, a brace connecting the said casing and the other limb of the first mentioned hanger, the said shaft being journaled through the casing, a longitudinal shaft journaled through the casing and operatively connected to the aforesaid shaft within the casing, an actuating member carried by the last mentioned shaft, and an oscillatory lever operatively connected to the said actuating member and having a blade at its lower end.

In testimony that we claim the foregoing as our own, we have hereto affixed our signatures in the presence of two witnesses.

JOE B. ADAMS.
LAWRENCE M. MILLER.

Witnesses:
CHAS. NAYLOR,
W. W. PIERCE.